F. N. SIMMONDS.
COUNTERBORE.
APPLICATION FILED JAN. 18, 1918.
1,308,304.
Patented July 1, 1919.
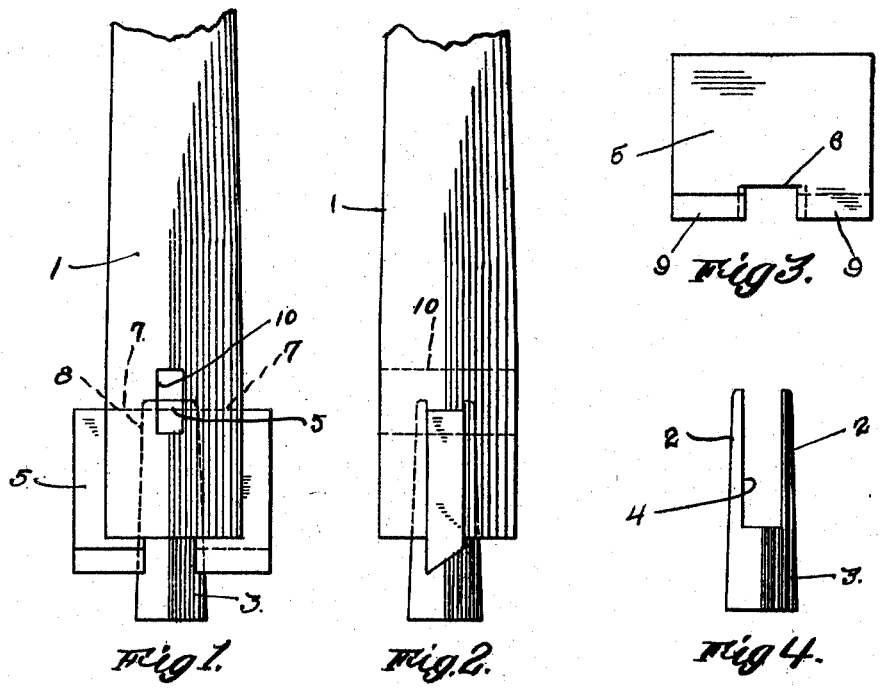
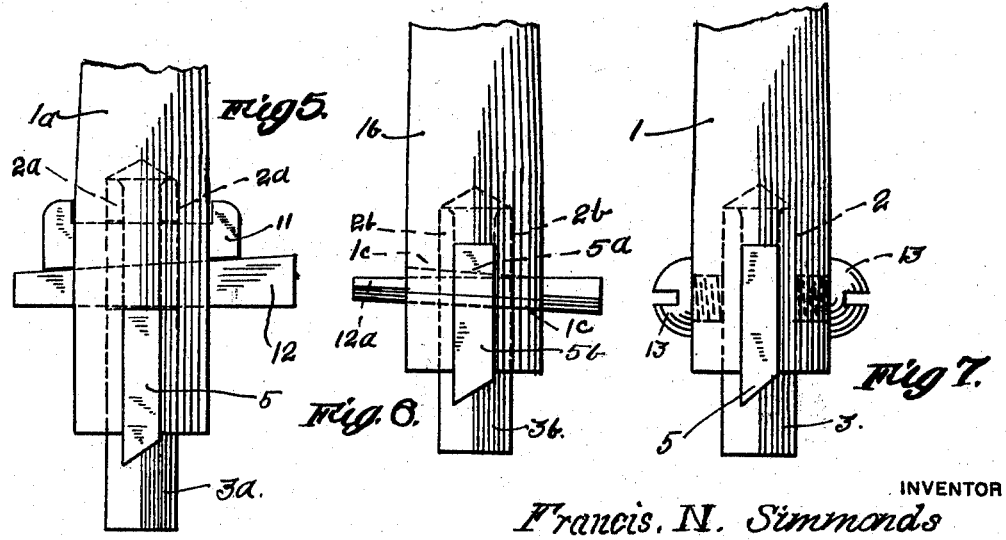
WITNESSES
INVENTOR
Francis. N. Simmonds

UNITED STATES PATENT OFFICE.

FRANCIS N. SIMMONDS, OF SAN FRANCISCO, CALIFORNIA.

COUNTERBORE.

1,308,304.                  Specification of Letters Patent.        Patented July 1, 1919.

Application filed January 18, 1918. Serial No. 212,475.

*To all whom it may concern:*

Be it known that I, FRANCIS N. SIMMONDS, a citizen of Great Britain, residing at San Francisco, in the county of San Francisco and State of California, have invented certain new and useful Improvements in Counterbores, of which the following is a specification.

This invention relates to boring tools, and more particularly to a tool used for counterboring purposes.

One of the main objects of the invention is to provide a tool of the character stated of simple construction and operation in which the cutting blade or element may be quickly and easily secured in or removed from the stock. A further object is to provide means for securing the cutting blade in the stock, this securing means also serving as a guide or post adapted to fit into a hole which has been bored so as to maintain the cutting blade in fixed relation to this hole during the counter-sinking operation. Further objects will appear from the detailed description.

In the drawings:

Figure 1 is a front view of a tool constructed in accordance with my invention.

Fig. 2 is a side view.

Fig. 3 is a detail of the cutting blade.

Fig. 4 is a detail of the securing pin.

Fig. 5 is a view similar to Fig. 2 of a modified form.

Fig. 6 is a similar view of another modified form.

Fig. 7 is a similar view of still another modified form.

Referring more particularly to Figs. 1 to 4 of the drawings—the stock 1 of the tool is provided with an axially disposed, and inwardly tapering bore of circular cross section. This bore is adapted to receive the spaced arms 2 of a securing pin 3 of circular cross section, this pin being tapered and being provided with a central longitudinal slot 4. Slot 4 receives the body 5 of the cutter which is in the form of a rectangular plate of steel. This cutter is provided at the center of its lower edge with a substantially rectangular cut-out or recess 6. The pin 3 is placed with its arms 2 at each side of the cutter body 5 fitting snugly about the same, the portion of the body of the pin adjacent the lower end of slot 4 fitting snugly into recess 6. The pin and blade are then inserted into the lower end of stock 1 which is provided with diametrical longitudinally extending slots 7 communicating with the central bore 8 of the stock for this purpose. The arms 2 of pin 3 have sufficient resiliency to permit them to be driven into the stock so as to firmly grip blade 5 thus securing the blade firmly in the stock.

The central recess 6 produces two depending spaced blades 9 at the lower edge of cutter 5. These blades have their lower edges oppositely beveled to provide oppositely directed cutting edges. By placing the lower end of pin 3 in a hole which has been bored in a piece of material, and then rotating stock 1, the blade or cutting element 5 will act to cut away the material contiguous to the hole so as to provide a counterbored portion or recess. By this means, a counterbore is provided which is adapted to receive a screw or other securing element of the button-head type. Of course, if desired, by having the blades 9 beveled upwardly and outwardly from their inner corners a counter-sink for a flat headed screw may be produced. When it is desired to remove the cutter body 5, this may be readily accomplished by forcing a tapered pin or wedge member through the diametrical slot 10 provided through stock 1 for this purpose, this slot being so positioned that the upper end of the cutter body 5 projects across the lower portion thereof, as in Figs. 1 and 2 of the drawings.

In the construction shown in Fig. 5, the arms 2ª of the pin 3ª are extended and provided with alined slots which receive a securing key 11 and a wedge 12 inserted through the same and through diametrically alined slots provided through the stock 1ª for this purpose. By removing the wedge member 12 and key 11, the pin 3ª and the plate 5 carried thereby may be readily removed from the stock. In Fig. 6, the elongated arms 2ᵇ of the pin 3ᵇ are provided with alined slots, these slots being in alinement with a slot 5ª provided through the plate 5ᵇ and with diametrically alined slots 1ᶜ provided through the stock 1ᵇ, a securing pin 12ª being inserted through the alined slots of these elements. By this means, the blade is detachably secured in the stock. In Fig. 7, the arms 2 of the pin 3 are engaged by set screws 13 threaded into the stock 1 and in alinement axially diametrically thereof. By means of these screws, the pin 3 and plate 5 carried thereby may be readily secured in or removed from the stock.

It will be evident that there may be slight changes made in the construction and arrangement of the different parts of my invention without departing from the field and scope of the same, and I intend to include all such variations, as fall within the scope of the appended claims in this application in which a preferred form only of my invention is disclosed.

What I claim is:

1. In a tool of the character described, a stock having a tapering axial bore and diametrically alined slots communicating with said bore and extending axially of the stock from the lower end thereof, a tapered securing pin adapted to fit into said bore and being provided in its upper portion with an axially extending diametrical slot, and a cutter fitting snugly into the slots of said stock and pin, said cutter being provided with cutting edges on its outer projecting edges.

2. In a tool of the character described, a stock having a tapering axial bore, a pin having spaced arms snugly fitted into said bore, and a cutter inserted between said arms of said pin, the outwardly projecting ends of said cutter being provided with cutting edges.

3. In a tool of the character described, a stock having a tapering axial bore and diametrically alined slots communicating with said bore and extending axially of the slot from the lower end thereof, a tapered securing pin adapted to fit in said bore and being provided in its upward portion with diametrically extended slots adapted to register with the slots in the stock, a cutter snugly fitted in one of said slots of the pin and stock, and a fastening element extended through the other slots in said stock and pin.

4. In a tool of the character described, a stock having a tapering axial bore and diametrically alined slots communicating with said bore and extending axially of the slot from the lower end thereof, a tapered securing pin adapted to fit in said bore and being provided in its upward portion with diametrically extended slots to register with the slots in the stock, a cutter snugly fitted in one of said slots of the pin and stock, and a wedge key insertible into the other slots of said pin and stock for maintaining said parts together.

In testimony whereof I affix my signature in presence of two witnesses.

FRANCIS N. SIMMONDS.

Witnesses:
 WILSON LYFORD,
 GEO. C. GOE.

Copies of this patent may be obtained for five cents each, by addressing the "Commissioner of Patents, Washington, D. C."